United States Patent
Kuo et al.

(10) Patent No.: US 10,397,303 B1
(45) Date of Patent: Aug. 27, 2019

(54) SEMANTIC ANNOTATION AND TRANSLATIONS FOR DEVICES

(71) Applicant: Amazon Technologies, Inc., Seattle, WA (US)

(72) Inventors: Calvin Yue-Ren Kuo, Irvine, CA (US); Jonathan I. Turow, Seattle, WA (US); Alan Conrad Rawcliffe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 15/250,732

(22) Filed: Aug. 29, 2016

(51) Int. Cl.
- *H04L 29/08* (2006.01)
- *H04L 29/12* (2006.01)
- *H04L 29/06* (2006.01)

(52) U.S. Cl.
CPC .............. *H04L 67/02* (2013.01); *H04L 61/15* (2013.01); *H04L 67/125* (2013.01); *H04L 67/42* (2013.01)

(58) Field of Classification Search
CPC ....... H04L 67/02; H04L 67/42; H04L 67/125; H04L 61/15
See application file for complete search history.

(56) References Cited

U.S. PATENT DOCUMENTS

| | | | |
|---|---|---|---|
| 9,280,747 B1* | 3/2016 | Jin | G06F 16/24578 |
| 9,781,098 B2* | 10/2017 | Mohamad Abdul | H04L 63/0823 |
| 9,888,072 B2* | 2/2018 | Watts, Jr. | H04L 67/1095 |
| 9,973,535 B2* | 5/2018 | Maher | H04L 63/20 |
| 10,091,278 B1* | 10/2018 | Garlapati | H04W 4/70 |
| 10,212,240 B2* | 2/2019 | Venkataramana | H04L 67/22 |
| 2011/0149932 A1* | 6/2011 | Kim | H04L 12/2836 370/338 |
| 2014/0359131 A1* | 12/2014 | Seed | H04W 4/70 709/226 |
| 2015/0067154 A1* | 3/2015 | Ly | H04L 43/0876 709/224 |
| 2015/0128285 A1* | 5/2015 | LaFever | H04L 67/02 726/26 |
| 2015/0213355 A1* | 7/2015 | Sharma | G06N 3/006 706/11 |
| 2015/0227618 A1* | 8/2015 | Dong | H04W 4/70 707/736 |

(Continued)

FOREIGN PATENT DOCUMENTS

| | | | | |
|---|---|---|---|---|
| CN | 103425740 B | * | 6/2016 | |
| WO | WO 2016110356 A1 | * | 7/2016 | G06N 5/02 |

*Primary Examiner* — Kostas J Katsikis
(74) *Attorney, Agent, or Firm* — Thorpe North & Western, LLP.

(57) ABSTRACT

A virtual device representation of an Internet of Things (IoT) device in a service provider environment having device state information associated with the virtual device representation may be identified to enable one or more services of the service provider environment and one or more IoT devices to communicate with the virtual representation of the IoT device. Semantic annotations associated with IoT device data for the IoT device may be identified in a device registry of the service provider environment. A request may be received for data using a URL to communicate with the virtual device representation. Canonical data may be obtained from the IoT device data in the virtual representation and the canonical data may be translated according to the semantic annotations to fulfill the request for data.

20 Claims, 8 Drawing Sheets

(56) References Cited

U.S. PATENT DOCUMENTS

| | | | |
|---|---|---|---|
| 2015/0237071 A1* | 8/2015 | Maher | H04L 63/20 726/1 |
| 2015/0264138 A1* | 9/2015 | Watts, Jr. | H04L 67/1095 709/203 |
| 2015/0381737 A1* | 12/2015 | Quinn | H04L 67/12 709/217 |
| 2016/0006837 A1* | 1/2016 | Reynolds | H04W 84/18 709/203 |
| 2016/0087933 A1* | 3/2016 | Johnson | H04W 4/70 709/245 |
| 2016/0087955 A1* | 3/2016 | Mohamad Abdul | G06F 8/60 726/7 |
| 2016/0119434 A1* | 4/2016 | Dong | H04W 4/70 709/220 |
| 2016/0173578 A1* | 6/2016 | Sharma | G06F 17/2785 709/203 |
| 2016/0275190 A1* | 9/2016 | Seed | H04W 4/70 |
| 2016/0277530 A1* | 9/2016 | Jung | H04W 4/70 |
| 2016/0315994 A1* | 10/2016 | Yun | H04L 67/02 |
| 2016/0350646 A1* | 12/2016 | Leeman-Munk | G06N 3/0445 |
| 2016/0352766 A1* | 12/2016 | Flacher | H04L 63/1425 |
| 2017/0006135 A1* | 1/2017 | Siebel | H04L 67/02 |
| 2017/0024485 A1* | 1/2017 | St. Martin | H04L 67/22 |
| 2017/0043255 A1* | 2/2017 | Savolainen | H04W 4/80 |
| 2017/0126836 A1* | 5/2017 | Krishna | H04L 67/32 |
| 2017/0187703 A1* | 6/2017 | Enrique Salpico | H04L 63/0236 |
| 2017/0195437 A1* | 7/2017 | Venkataramana | H04L 67/22 |
| 2017/0272316 A1* | 9/2017 | Johnson | G06Q 10/103 |
| 2017/0279685 A1* | 9/2017 | Mota | H04L 41/12 |
| 2017/0279694 A1* | 9/2017 | Sartran | H04L 43/08 |
| 2017/0279827 A1* | 9/2017 | Savalle | H04L 63/1425 |
| 2017/0279830 A1* | 9/2017 | Mermoud | H04L 63/1416 |
| 2017/0279831 A1* | 9/2017 | Di Pietro | H04L 63/1425 |
| 2017/0279848 A1* | 9/2017 | Vasseur | H04L 63/1458 |
| 2017/0279849 A1* | 9/2017 | Weibel | H04L 63/1458 |
| 2017/0284691 A1* | 10/2017 | Sinha | F24F 11/006 |
| 2017/0300693 A1* | 10/2017 | Zhang | G06F 21/566 |
| 2018/0013681 A1* | 1/2018 | Kohout | H04L 47/2441 |
| 2018/0054472 A1* | 2/2018 | Greenspan | H04L 67/10 |
| 2018/0054490 A1* | 2/2018 | Wadhwa | H04L 67/125 |
| 2018/0063250 A1* | 3/2018 | Justin | H04L 67/125 |
| 2018/0091391 A1* | 3/2018 | Turow | G06F 17/30345 |
| 2018/0136979 A1* | 5/2018 | Morris | G06F 9/5055 |
| 2018/0159930 A1* | 6/2018 | Watts | H04L 67/1095 |

* cited by examiner

SEMANTIC ANNOTATION AND TRANSLATIONS FOR DEVICES

BACKGROUND

The Internet of Things (IoT) is the interconnection of computing devices scattered across the globe using the existing Internet infrastructure. IoT devices may be embedded in a variety of physical devices or products, such as home appliances, manufacturing devices, industrial printers, automobiles, thermostats, smart traffic lights, vehicles, buildings, etc. These physical devices may have embedded electronics, software, sensors, and network connectivity that enables these physical devices to collect and exchange data. The IoT may be useful for a number of applications, such as environmental monitoring, farming, infrastructure management, industrial applications, building and home automation, energy management, medical and healthcare systems, transport systems, etc.

In addition, the semantic web provides a common framework that allows semantic data to be shared and reused across applications, enterprises, and community boundaries. The semantic web can be described as a web of data, such as dates, titles, part numbers, chemical properties, and any other conceivable semantic data that can be published and linked so that the data is available to anyone wanting to access it. The technical standards commonly used with the semantic web include: RDF (Resource Description Framework), which is a data modeling language for the semantic web used to store and represent semantic information; SPARQL (SPARQL Protocol and RDF Query Language), which is an RDF query language designed to query data across various systems; and OWL (Web Ontology Language), which is a schema language or knowledge representation language used to define concepts that can be reused.

DETAILED DESCRIPTION

Figure 1:
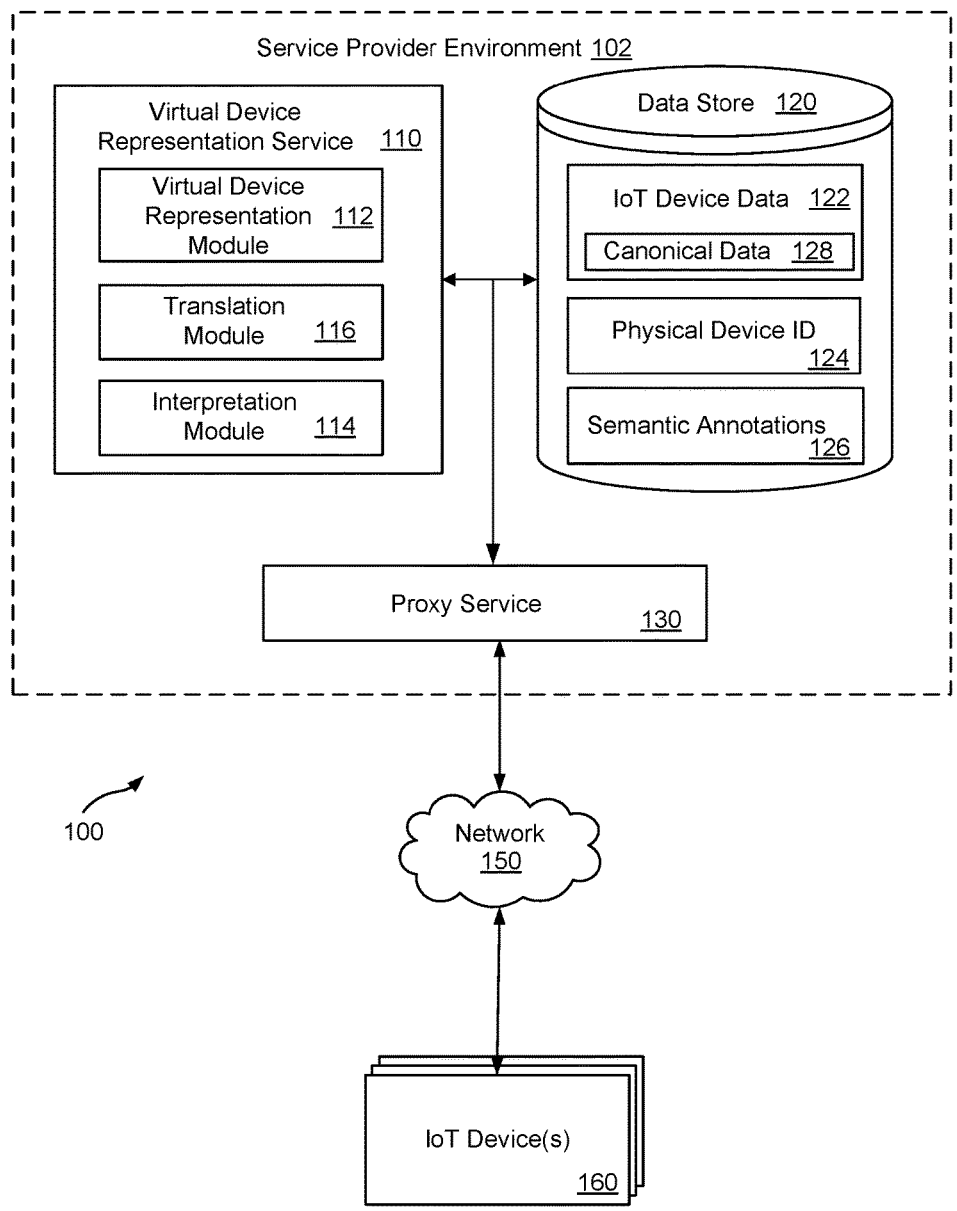
FIG. 1 is a diagram illustrating an example of providing semantic translation for internet of things (IoT) devices according to an example of the present technology.

A technology is described providing semantic translation for internet of things (IoT) devices and representations of the IoT devices (e.g., shadow representations) stored in a service provider environment. An example method may include creating a virtual device representation of a semantic Internet of Things (IoT) device in a service provider environment having device state information associated with the virtual device representation to enable one or more services of the service provider environment and/or one or more IoT devices to communicate with the semantic translators. A device (e.g., an IoT device) may be one of many devices that create a large network of addressable devices. This "network" is commonly referred to as the Internet of Things (IoT). A state of a device may be electronically represented using a device representation managed by the device shadowing service in a service provider environment.

In one aspect, a device shadowing service may create a persistent, virtual version, or "shadow," (e.g., virtual device representation or "virtual shadow representation") of each device (e.g., IoT device) that includes the device's most last reported state and any desired future state so that applications or other devices can read messages and interact with the virtual device representation without contacting the physical device. The device representations or device shadows may persist the last reported state and a desired future state of devices even when the physical device is offline. The last reported state of a device may be retried and/or a desired future state may be set through an application programming interface (API).

In an additional aspect, a unique identifier may be assigned to the IoT device to enable one or more services and the one or more IoT devices to communicate with the virtual device representation of the semantic IoT device. The unique identifier may be an Internet Protocol version 6 (IPv6) address, an IPv4 address, a uniform resource identifier (URI), and/or a global unique identifier. The device registry may establish an identity for devices and may track metadata such as the IoT devices' attributes and capabilities. The registry may assign the unique identity to each device that is consistently formatted regardless of the type of device or how the device connects. The registry may also support metadata that describes the capabilities of a device, for example whether a sensor reports temperature, and if the data is Fahrenheit or Celsius.

The unique identifier may be translated into a uniform resource locator (URL). Semantic annotations associated with IoT device data or device functions in a device registry may be defined. A request may be received using the URL to communicate with the virtual device representation. Each I/O (input/output) operation of the IoT device may be proxied to the virtual device representation including semantic translations via an IoT device gateway. The I/O operations may be interpreted according to the semantic annotations.

A semantic annotation may be placed in the registry (e.g., a file or document of the registry) relating to the virtual device representation in the device shadowing service. For example, the semantic annotation may be inserted and/or appended to IoT device data, which may be included in the registry. The semantic annotation may link to the IoT device data for the virtual device representation, and the semantic annotation may reference ontological data that provides desired translation or "semantic context" for the IoT device data. The ontological data may be stored in an ontological data store located in the device shadowing service or stored independently in the service provider environment.

In an additional aspect, each IoT device may be authenticated according to IoT device credentials of the IoT device. The IoT device credentials may be stored in the device registry. The semantic annotations may be stored with at least a portion of the metadata for an IoT device. The semantic annotations associated with ontological data that describes semantic context in relation to the IoT device may be defined in the ontological data store. A state of the IoT device may be synchronized with a state of the virtual representation. One or more events or notifications may be sent upon a state change to the virtual representation. Each event or notification may be annotated with the semantic annotations to enable the one or more services and the one or more IoT devices to interpret the event. In addition, the semantic annotations may be used to enable conversions from data stored in canonical form in a virtual representation into a form understood by requesting devices or programs.

FIG. 1 illustrates a system 100 for providing semantic translation and interpretation for internet of things (IoT) devices and virtual device representations in a service provider environment 102 according to an example of the present technology. The system 100 may include a virtual device representation service 110 functioning as a device shadow service, a data store 120 (e.g., a "registry"), a proxy service 130, a network 150, and/or one or more IoT devices 160. In one aspect, the data store 120 may be a device registry.

In one aspect, the service provider environment 102 may provide virtualized computing services (i.e., virtualized computing, virtualized storage, virtualized networking, etc.) to IoT devices 150. More specifically, the service provider environment 102 may provide virtualized computing, virtualized storage, virtualized networking and other virtualized services that are executing on a hardware substrate. Also, the service provider environment 102 may be in data communication with one or more IoT devices 160 by way of the network 150 that may include a virtual network that is within a service provider environment 102 or other suitable networks, etc.

The data store 120 may include one or more physical device identifiers (ID) 124 that may be a unique identifier assigned to each physical device. The unique identifier may be translated into a uniform resource locator (URL) to enable the one or more services and the one or more IoT devices to communicate with a virtual device representation provided by the virtual device representation module 112 of the virtual device representation service 110. The semantic annotations 126 associated with semantic IoT device data 122 may be defined and stored in the data store 120.

The virtual device representation module 112 may create a virtual device representation of an Internet of Things (IoT) device (e.g., one of the IoT devices 160) in association with the service provider environment 102 by having device state information associated with the virtual device representation to enable one or more services of the service provider environment 102 and/or one or more IoT devices 150 to communicate with the IoT device having the virtual device representation created by the virtual device representation module 112. The proxy service 120 may proxy each I/O operation of the IoT device and update the virtual device representation created by the virtual device representation module 112. The I/O operations may be interpreted using the interpretation module 114 according to the semantic annotations 116. For example, the semantic annotation may represent a data format, a data conversion, a function meaning, a link to schema for interpreting the data, and similar semantic annotations for interpreting the data.

In one aspect, the translation module 116 may receive the API calls for attribute information. The translation module 116 may obtain the IoT attribute from the IoT Device data in a canonical format and translate the canonical format to a format that is understood by the requesting device. The format of the requesting device may be detected by either the API or device attributes of the device in the shadow copy of the IoT device. The canonical data 128 may be stored in the data store 120.

The semantic annotation 126 may be a form of an annotation that includes one or more semantic URIs, RDF (Resource Description Framework) triples, and/or semantic metadata that can be added to the semantic IoT device data 122.

Consider the following example of an implementation of the aforementioned functionality. As a preliminary matter, the present technology addresses multiple challenges involving IoT devices. Currently it is common for each IoT device to have their own device software development kit (SDK). A developer would need to use a device specific SDK to send commands and parse results. Despite attempts to create standardized command sets, a significant problem exists at multiple layers in a stack, from a physical wireless channel, to transport protocols to application commands. For example, a smart light bulb manufacturer may use the command "light.on" and "light.off" while another manufacturer may use the command "light_toggle" to control the on and off state of a light. This extends beyond commands, such as, for example, to input and output data. For example, two temperature sensors in the same environment may report "45" and "17" respectively, because the first sensor is reporting in Fahrenheit while the second is reporting in Celsius. This fragmentation in semantics makes it difficult for devices across manufacturers to understand each other and ultimately diminishes IoT device performance efficiency and end-consumer experiences. The present technology overcomes the semantic problems created by a large system of devices and processes.

In addition to overcoming fragmentation in semantics, the aforementioned functionality proposes a solution for addressing other current challenges, by way of example only, in the difficulty of updating logic residing in IoT device firmware, adding new functionality to the device that requests a user to flash firmware, and limitations on the amount of code that can be dedicated to new features on an IoT device with limited storage capacity. These, and other challenges common to IoT devices, may result in significant long time intervals between software or firmware updates with many manufactures of devices electing not to add new functionality over the lifetime of the device. Moreover, each manufacturer may also have a unique way of identifying devices, while end customers expect interoperability between devices. Thus, it becomes significantly difficult for a developer to create software that is able to address and communicate with one or more IoT devices provided by different manufacturers.

Accordingly, the present technology provides a result where a representation (e.g., the virtual device representation) of the IoT device may be created in a service provider environment allowing one or more developers to design functionality and program code that may interact with the this representation just like any other application or service as compared to a hardware device. This representation may be uniformly addressable across multiple platforms regardless of IoT device types and/or manufacturers.

In one aspect, requests to and/or responses from the device may be proxied via the virtual device representation. A cache of the device state or IoT device data 122 with canonical data 128 may be maintained in the virtual device representation. The cache of the device state may be used to respond to inquiries without "waking up" the actual physical device. Also, other "listeners" may be allowed to be added that listen for device state changes in the virtual device representation. In this way, designers, manufacturer, applications, other IoT devices, and/or developers are enabled to add logic, functionality, and/or program code that can react to changes in the physical world (e.g., to the physical device).

The virtual device representation enables designers, manufacturer, applications, other IoT devices, and/or developers to add new or different functionality to the virtual device representation in the service provider environment. For example, a manufacturer may extend the scheduling functionality of smart coffee maker by adding integration with a smart radio clock, so that the smart coffee maker would only start brewing if an alarm is set. New, different, and/or alternative functionality may be added to the virtual device representation without updating firmware on the actual physical device. In short, the present technology enables designers, manufacturers, applications, other IoT devices, and/or developers to use the vocabulary of their choosing and allow data to be annotated with semantics by building upon the services provided in a computing environment.

Figure 2:
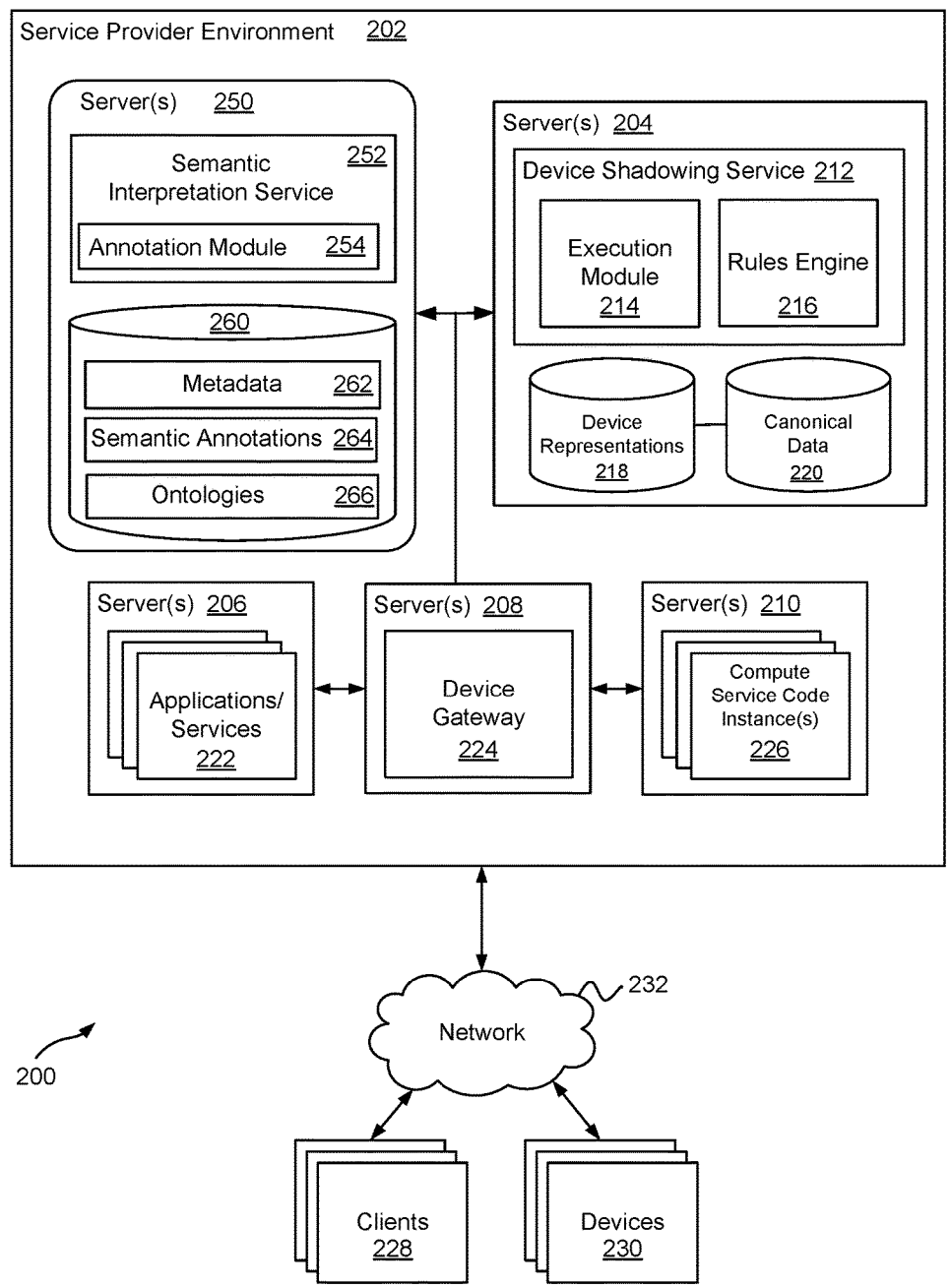
FIG. 2 is a block diagram that illustrates various example components included in a system for operating a device shadowing service and providing semantic translation for internet of things (IoT) devices according to one aspect of the present technology.

FIG. 2 is a diagram that illustrates a system 200 for operating a device shadowing service and providing semantic translation and interpretation for internet of things (IoT) devices. FIG. 2 illustrates components of an example system 200 on which the present technology may be executed. The system 200 may include a plurality of devices 230 in communication with a service provider environment 202 via one or more networks 232. Illustratively, the devices 230 can include network addressable: global positioning devices, temperature sensors, water sensors, light switches, light bulbs, power outlets, watches, media players, voice command devices, video cameras, security systems, door locks, smoke alarms, thermostats, weather sensors, vehicles, handheld devices, as well as any other device configured to communicate over a network 232.

Figure 4:
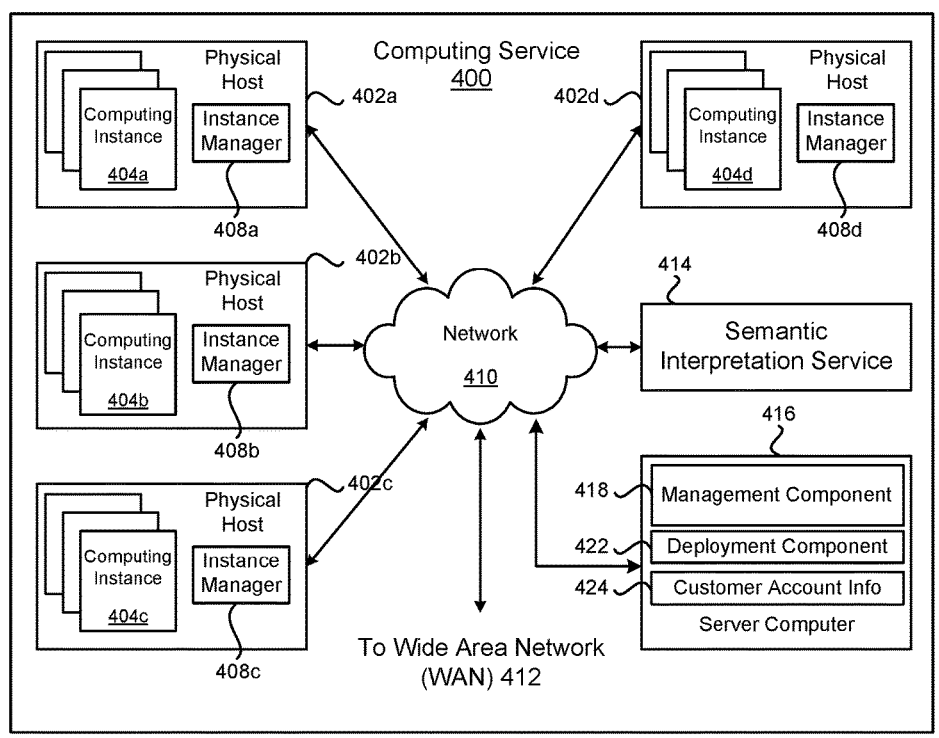
FIG. 4 is a block diagram that illustrates an example computing service environment that includes a semantic annotation service according to one aspect of the present technology.

The service provider environment 202 may include servers 204/206/208/210/250 for executing computing instances (e.g., virtual machines) as described in relation to FIG. 4. The computing instances may host various services associated with or for the devices 230. The server 204 may include one or more computing instances that host a device shadowing service 212 configured to manage device representations 218 (e.g., virtual device representation or 'persistent, virtual versions') associated with the devices 230. The device representations 218 may, in one example, include data objects stored using a data-interchange format like JavaScript Object Notation (JSON) in an object data store, a NoSQL data store, or a relational data store. The device representations 218 may be made available by the device shadowing service 212 to clients 228, applications and/or services 222 at any time without the need to wake up or otherwise contact an associated device 230.

In one example, the device shadowing service 212 may include an execution module 214 configured to execute state changes 220 in response to state change requests received from clients 228, applications and/or services 222. The applications and services 222 may execute on servers 206 included in the service provider environment 202, as well as on clients 228 that may be external to the service provider environment 202.

In receiving a state change request, the execution module 214 may be configured to submit a state change to a rules engine 216 for execution of state transition commands that update the state of a device 230. In one example, the rules engine 216 may be configured to evaluate state transition commands to transform the state transition commands to formatted instructions recognized by a device 230 associated with a state change request, and publish messages intended for the device 230 that include the formatted instructions. For example, the rules engine 216 may convert a state transition command to device recognizable instructions, generate a message for each state transition command that includes the device recognizable instructions, and publish the messages to an intended device 230 using a command response pattern that publishes a message to the device 230 and awaits an indication that the device 230 has assumed a specified state before publishing any further state change to the device.

In another example, the execution module 214 may be configured to launch an instance of a compute service code 226 on behalf of the device shadowing service 212. The server 210 may be configured to host computing instances that execute instances of compute service code 226. Illustratively, an instance of a compute service code may include computer code executed in response to an event, (e.g., a request for data or a function by a device or device shadow). A compute service may manage computing resources utilized by the computer code using a computing instance hosted in the service provider environment 202 as described in relation to FIG. 4.

The system 200 may include a device gateway 224 configured to exchange messages using a publication/subscription broker service, which enables one-to-one and one-to-many communications. A one-to-many communication pattern may allow a device 230 to broadcast data to multiple subscribers for a given topic. For example, a system component may publish a message to a named logical channel (e.g., topic) and the message may be distributed to subscribed system components. System components may include, but are not limited to, the device shadowing service 212, clients 228, instances of compute service code 226, applications and services 222. The device gateway 224 may support protocols that include MQTT (Message Queue Telemetry Transport), CoAP (Constrained Application Protocol), HTTP (Hyper Text Transport Protocol), or HTTPS (Hyper Text Transport Protocol Secure) protocols, as well as proprietary or legacy protocols. The device gateway may be configured to scale automatically to support a number of devices 230 (thousands, millions, or even billions of devices 230) using computing resources included in the service provider environment 202.

The service provider environment 202 may include one or more servers 250, which may include a semantic interpretation service 252, an annotation module 254, and a registry 260, having metadata 262 representing the type of data a device would like to receive, and semantic annotations 264 for the IoT devices. The annotation module 254 may be configured to enable one or more semantic annotations 264 to be associated with the IoT device data or device representations 218. For example, clients 228, applications and services 222 may send one or more messages to the device representation 218. The annotation module 254 may interpret the messages and/or append one or more semantic annotations 264 to the messages for storing to the device representations 218. In one aspect, the annotation module 254 may append to the semantic annotations and/or obtain the semantic annotations from a document associated with the device shadowing service 212, which may include mappings that map the semantic annotations to the metadata 260.

In one aspect, the ontological data 266, may be created to represent an architecture of the service provider environment 202 and client 218 service concepts, such as configurations, known issues, known misconfigurations, enhancements, trouble tickets, computing nodes, computing node configurations, etc. In one aspect, an ontologies (also called vocabularies) may be linked to the semantic annotations and may be the building blocks for inference techniques used on the semantic web. Ontologies (e.g., Ontological data) may be used to define concepts and relationships that describe and represent an area of concern that may be provided through the semantic web. Ontologies may be used to classify terms which can be used in a particular application, characterize possible relationships, and define possible constraints on using the terms. The various ontological data may be provided by third parties, clients 218, applications/services 222, and offered as independent data stores in a computing service environment containing the ontologies. In other words, the ontologies may be crowd sourced from other customers that execute architectures in the service provider environment 202. These clients 218 and/or applications/services 222 may share knowledge on certain configurations, known symptoms of a misconfiguration, tunable properties to improve performance, error identification, etc. through the ontologies.

In one example, clients 228, applications and services 222 may publish messages containing state change requests to named logical channels associated with devices representations 218 and the messages may be distributed to the device shadowing service 212, which may be subscribed to receive the messages. Thereafter, communications associated with the state change request between the device shadowing service 212 and the client 228 may include a transaction identifier.

The various processes and/or other functionality contained on the system components included in the system 200 may be executed on one or more processors that are in communication with one or more memory modules. The system 200 may include a number of computing devices that are arranged, for example, in one or more server banks or computer banks or other arrangements. The computing devices may support the service provider environment 202 using hypervisors, virtual machine monitors (VMMs) and other virtualization software.

Device representations 218 and canonical data 220 for the device representations may be stored in one or more data stores. In one example, a key value data store that is external to a device 230 may be used to store a device representation 218. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 202 and may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 232 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Consider the following example of an implementation of the aforementioned functionality using pseudocode. The provided example illustrates a soda fountain to illustrate the flow of the system. 1) A manufacturer may describe the state of a device and store the metadata and configuration about the device in the registry. 2) A device may send a message to the device state service to initialize a device shadow representation with the current state values, which may resemble:

Dest=device state service
action=POST {
'Deviceid': 'abc123',
'Syrup': {
'Cherry coke': {'level': '40'},
'Sprite': {'level': '34'},
'Vanilla coke': {'level': '80'}
},
'Sensors': {
'Maintenance door': {
'Status': 'closed'
},
'Ice maker': {
'Status': '1'

}
},
'Sigv4lite': 'xxxyyyzzz'
}

3) At some later time or upon expiration of a selected time period, the device may send a message showing the cherry coke syrup level has changed, which may resemble
Dest=device state service
action=PUT
{
'Deviceid': 'abc123','Syrup': {
'Cherry coke': {'level': '15' }
},
'Sigv4lite': 'xxxyyyzzz'
}

4) The device state service may update device state information for the device and may issue an event, such as using a JSON document. The device state service may use the metadata stored in a metadata and configuration service to annotate the event with semantic information. Another system (e.g., the semantic interpretation service 252) that parses the event will now know that 'Syrup/Cherry Coke/level' is a measurement of an absolute percentage and can interpret the event with the semantic information. Additionally, "Coke: may define its own type to mean specifically syrup level, for example, 'http://schema.cokecola.com/measurement/syruplevel'. This would allow other developers to understand Coke's event structure in order to expose the event structure, which may resemble:
{
'Event type': 'updated',
'Deviceid': 'abc123',
'State': {
'@type': 'http://spectre.amazonaws.com/schema/devicestate',
'Syrup': {
'Cherry coke': {'level': '15', '@type':
'http://semantic.amazonaws.com/measurement/absolute/percentage' },
'Sprite': {'level': '34',
'@type': 'http://semantic.amazonaws.com/measurement/absolute/percentage' },
'Vanilla coke': {'level': '80',
'@type': 'http://semantic.amazonaws.com/measurement/absolute/percentage' }
},
'Sensors': {
'Maintenance door': {
'Status': 'closed',
'@type': 'http://semantic.amazonaws.com/state/binary/openclose'},
'Ice maker': {
'Status': '1', '@type': 'http://semantic.amazonaws.com/state/binary/openclose.

Thus, a manufacturer may describe the semantic configuration of a device associated with the virtual device representation and store the metadata and configuration about the device along with semantic annotations and links to semantic schemas in the registry. Each I/O operation of the semantic IoT device may be proxied to the virtual device representation via a semantic IoT device gateway. The I/O operations may be interpreted according to the semantic annotations.

Figure 3:
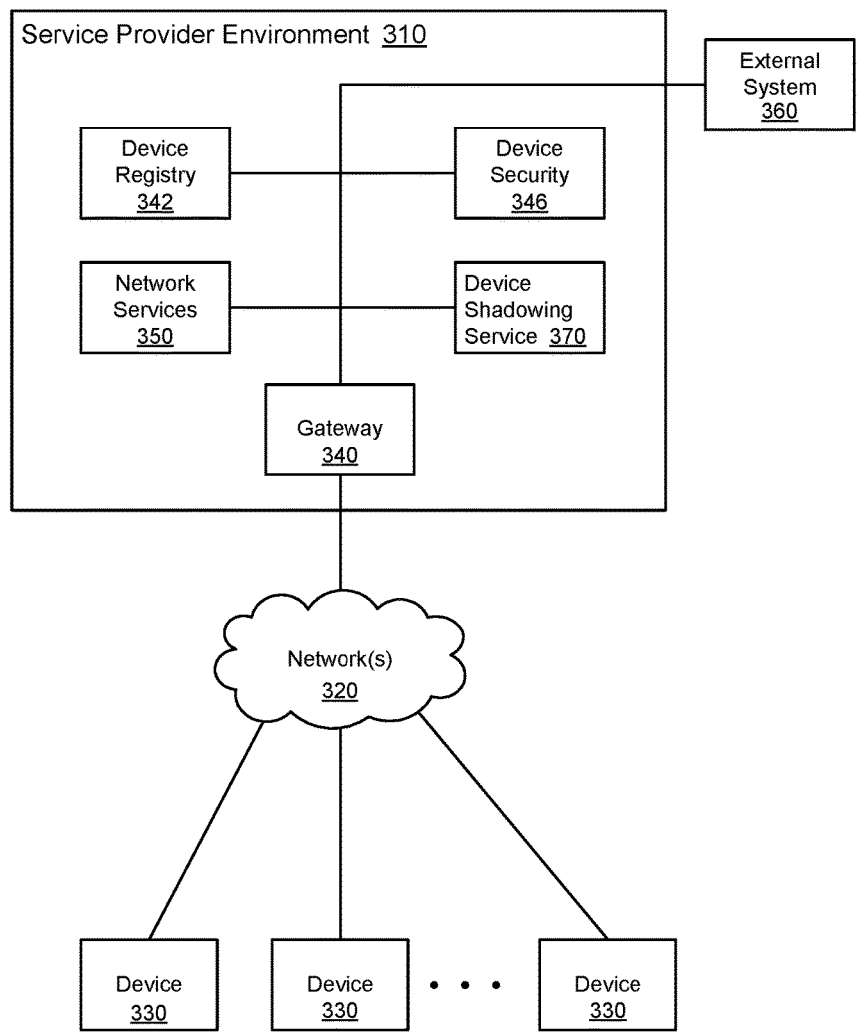
FIG. 3 is a block diagram illustrating an example computer networking architecture for providing IoT devices access to IoT computing services according to one aspect of the present technology.

FIG. 3 is a block diagram illustrating an example service provider environment 310 with which the devices 330 or IoT devices described earlier may communicate. The service provider environment 310, which may be referred to as a device communication environment or system that comprises various resources made accessible via a gateway server 340 to the devices 330 that access the gateway server 340 via a network 320. The devices 330 may access the service provider environment 310 in order to access services such as a device shadowing service 370, data storage, and computing processing features. Services operating in the service provider environment 310 may communicate data and messages to the devices 330 in response to requests from the devices 330 and/or in response to computing operations within the services.

The service provider environment 310 may comprise communicatively coupled component systems 340, 342, 346, 350 and 370 that operate to provide services to the devices 330. The gateway server 340 may be configured to provide an interface between the devices 330 and the service provider environment 310. The gateway server 340 receives requests from the devices 330 and forwards corresponding data and messages to the appropriate systems within the service provider environment 310. Likewise, when systems within the service provider environment 310 attempt to communicate data instructions to the devices 330, the gateway server 340 routes those requests to the correct device 330.

The gateway server 340 may be adapted to communicate with varied devices 330 using various different computing and communication capabilities. For example, the gateway server 340 may be adapted to communicate using either TCP (Transmission Control Protocol) or UDP (User Datagram Protocol) protocols. Likewise, the gateway server 340 may be programmed to receive and communicate with the devices 330 using any suitable protocol including, for example, MQTT, CoAP, HTTP, and HTTPS. The gateway server 340 may be programmed to convert the data and instructions or messages received from the devices 330 into a format that may be used by other server systems comprised in the service provider environment 310. In one example, the gateway server 340 may be adapted to convert a message received using the HTTPS protocol into a JSON formatted message that is suitable for communication to other servers within the service provider environment 310.

The gateway server 340 may store, or may control the storing, of information regarding the devices 330 that have formed a connection to the particular gateway server 340 and for which the particular gateway server 340 may be generally relied upon for communications with the device 330. In one example, the gateway server 340 may have stored thereon information specifying the particular device 330 such as a device identifier. For each connection established from the particular device 330, the gateway server 340 may also maintain information identifying the connection. For example, a connection identifier may be generated and stored for each connection established with a particular device 330. Information relating to the particular connection may also be stored. For example, information identifying the particular socket of the gateway server 340 on which the connection was established, as well as information identifying the particular protocol used by the device 330 on the connection may be stored by the gateway server 340. Information such as the socket and protocol may be used in order to facilitate further communications via the particular connection.

In one example, the gateway server 340 may communicate via any suitable networking technology with a device registry server 342. The device registry server 342 may be adapted to track the attributes and capabilities of each device 330. In an example, the device registry sever 342 may be provisioned with information specifying the attributes of the devices 330. The device registry server 342 may comprise data specifying rules or logic (e.g., automation rules) for handling various requests that may be received from the devices 330. The device registry server 342 may be programmed to convert specialized device functions or commands received in particular communication protocols such as, for example HTTPS, MQTT, CoAP, into functions or commands using particular protocols that are understood by other of the servers in the service provider environment 310. In one example, the device registry server 342 may be provisioned with information specifying that upon receipt of a particular request from a particular device 330, a request should be made to store the payload data of the request in a particular network service server 350. The device registry server 342 may be similarly programmed to receive requests from servers 342, 350 and convert those requests into commands and protocols understood by the devices 330.

The device shadowing service server 370 maintains state information for each connected device 330. In an example embodiment, the device shadowing service server 370 maintains for each device 330 that has connected to the environment 310 information specifying a plurality of states. In an example scenario, the device shadowing service server 370 may comprise a recorded state and a desired state. The recorded state represents the existing state of the particular device 330 as presently known to the device shadowing service server 370. The device shadowing service server 370 may be configured to manage multi-step device state transitions as described earlier. The device shadowing service server 370 communicates with the device gateway 340 in order to communicate requests to update a status to a particular device 330. For example, the device shadowing sever 370 may communicate to the device gateway 340 a sequence of state transition commands that update the status of a device 330. The device gateway 340 may, in response, communicate the appropriate commands formatted for the particular device.

The device security server 346 maintains security-related information for the devices 330 that connect to the service provider environment 310. In one example, the device security server 346 may be programmed to process requests to register devices with the service provider environment 310. For example, entities such as device manufacturers, may forward requests to register devices 330 with the service provider environment 310. The device security server 346 receives registration requests and assigns unique device identifiers to devices 330 which use the device identifiers on subsequent requests to access the service provider environment 310. The device security server 346 stores, for each registered device, authentication information that may be provided during the device registration process. For example, a request to register a device 330 may comprise information identifying the device 330 such as a device serial number and information for use in authenticating the device 330. In one example, the information may comprise a digital certificate and may comprise a public key of a public key-private key pair. The information may be stored in relation to the assigned device identifier for the particular device 330. When the device 330 subsequently attempts to access the service provider environment 310, the request may be routed to the device security server 346 for evaluation. The device security server 346 determines whether authentication information provided in the request is consistent with the authentication information stored in relation to the device identifier and provided during the registration process.

The device security server 346 may be further programmed to process request to associate particular entities (individuals or organizations) with particular devices 330. The device security server 346 may be adapted to receive requests to register entities, which may be, for example, individuals, users, accounts, and/or organizations, as authorized to control or communicate with a particular device 330. In one example, a request may be received from an individual or organization that may have purchased a device 330 from a manufacturer. For example, the device may be a dishwasher, thermostat, or lighting assembly that an individual or organization purchased from the manufacturer. The individual or organization may initiate a request to register the device 330 with the individual or an organization with which the organization is associated. The request may be routed to a web services server which may be comprised in service provider environment 310 or which communicates the request to the service provider environment 310. The request identifies the device 330 and the particular entity (individual or organization) that is requesting to be associated with the device 330. In one example, the request may comprise a unique device identifier that was assigned when the device 330 was registered with the system. The request further may comprise information uniquely identifying the entity that is registering as having authority to communicate with and/or control the particular device 330.

The device security server 346 stores the information identifying the particular entity in relation with the device identifier. When the particular entity subsequently attempts to control or communicate data to the particular device 330, the device security server 346 may use the information to confirm that the particular entity is authorized to communicate with or control the particular device 330. When an entity that has not been registered as being authorized to communicate with the device 330 attempts to communicate with or control the device 330, the device security server 346 may use the information stored in the device security server 346 to deny the request.

A network services server 350 may be any resource or processing server that may be used by any of servers 340, 342, 346, or 370 in processing requests from the devices 330. In one example, network services server 350 may provide data storage and retrieval services and/or on-demand processing capacity. In an example scenario, the network services server 350 may be any of numerous network accessible services including, for example, web or cloud-based services. In one example, the web services server 350 may be programmed to provide particular processing for particular devices 330 and/or groups of devices 330. For example, a network services server 350 may be provisioned with software that coordinates the operation of a particular set of devices 330 that control a particular manufacturing operation.

Servers 340, 342, 346, 350, and 370 may be communicatively coupled via any suitable networking hardware and software. For example, the servers may communicate via a local area network or wide area network.

An external system 360 may access service provider environment 310 for any number of purposes. In one example, an external system 360 may be a system adapted to forward requests to register devices 330 with the service provider environment 310. For example, an external system 360 may include a server operated by or for a device manufacturer that sends requests to service provider environment 310, and device security server 346 in particular, to register devices 330 for operation with service provider environment 310. Similarly, the external system 360 may be a system operated to provide a gateway for entities (individuals or organizations) to register an ownership or control relationship with a particular device 330.

The devices 330 may be any devices that may be communicatively coupled via a network 320 with the service provider environment 310. For example, the devices 330 may be computing devices such as smart phones and tablet computers, automobiles, appliances such as washers and driers, industrial sensors, switches, control systems, etc. In one example, each of devices 330 may communicate over the network 320 to store data reflecting the operations of the particular device 330 and/or to request processing provided by, for example, network services server 350. While FIG. 3 depicts three devices 330, it will be appreciated that any number of devices 330 may access the service provider environment 310 via the gateway server 340. Further it will be appreciated that the devices 330 may employ various different communication protocols. For example, some devices 330 may transport data using TCP, while others may communicate data using UDP. Some devices 330 may use MQTT, while others may use CoAP, and still others may use HTTPs. It will also be appreciated that each of devices 330 may be programmed to send and receive particular functions or commands in its requests that are not compatible with other devices or even the systems within service provider environment 310. The gateway server 340 may be programmed to receive and, if needed, attend to converting such requests for processing with the service provider environment 310.

FIG. 4 is a block diagram illustrating an example computing service 400 that may be used to execute and manage a number of computing instances 404a-d. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of servers 402a-d. While four servers are shown, any number may be used, and large data centers may include thousands of servers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the servers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

In one example, a server 414 may execute a semantic interpretation service 414 configured to annotate operation code with semantic annotations as described earlier. In another example, the semantic interpretation service 415 may be hosted on one or more computing instances 404a-d.

A server 416 may be reserved to execute software components 418, 422, 424 that manage the operation of the computing service 400 and the computing instances 404a-d. A customer may access a management component 418 to configure various aspects of the operation of the computing instances 404a-d purchased by a customer. For example, the customer may setup computing instances 404a-d and make changes to the configuration of the computing instances 404a-d.

A network 410 may be utilized to interconnect the computing service 400 and the servers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
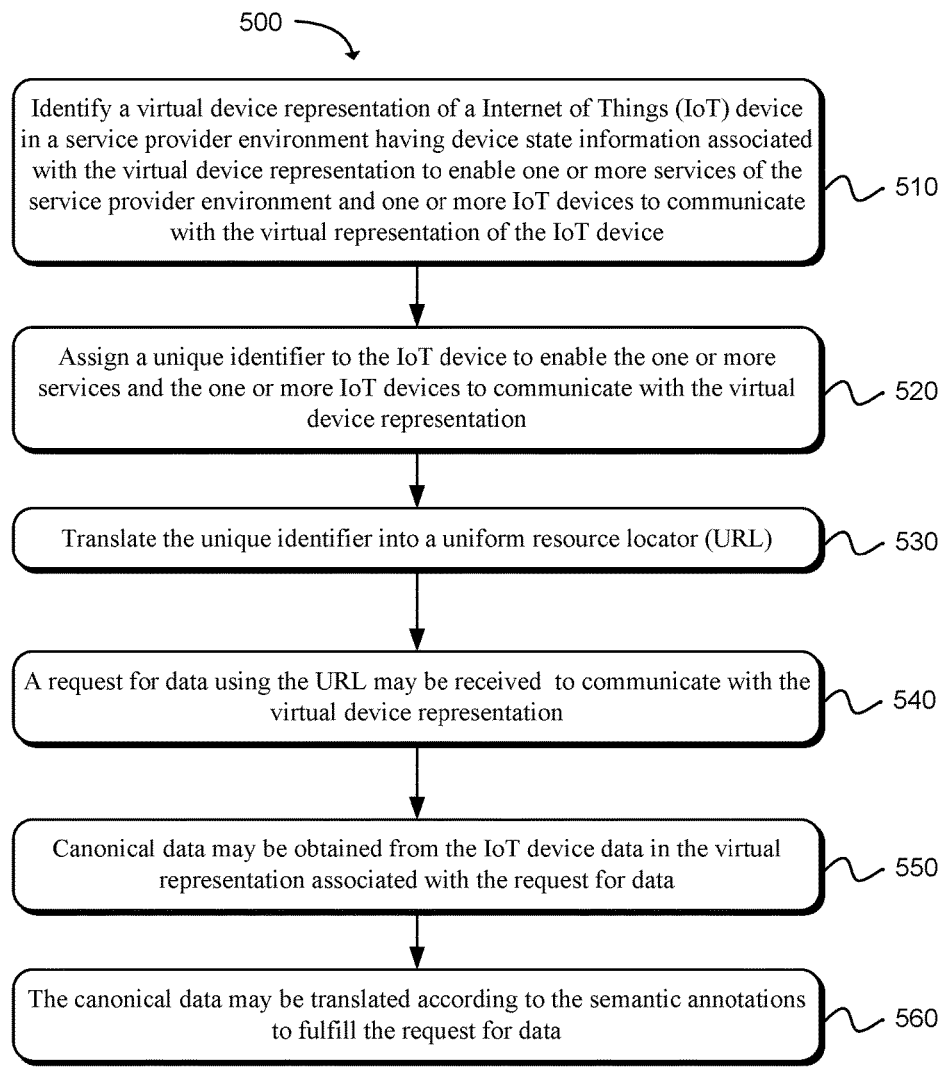
FIG. 5 is a flow diagram illustrating an example method for providing semantic translation for internet of things (IoT) devices using a device shadowing service according to one aspect of the present technology.

FIG. 5 is a flow diagram illustrating an example method for providing semantic translation for internet of things (IoT) devices using a device shadowing service according to one aspect of the present technology. The functionality 500 may be implemented as a method and executed as instructions on a machine, where the instructions are included on at least one computer readable medium or one non-transitory machine-readable storage medium. For example, starting in block 510, the method may include identifying a virtual device representation of a Internet of Things (IoT) device in a service provider environment having device state information associated with the virtual device representation to enable one or more services of the service provider environment and one or more IoT devices to communicate with the virtual representation of the IoT device. A unique identifier may be assigned to the IoT device to enable the one or more services and the one or more IoT devices to communicate with the virtual device representation, as in block 520. The unique identifier may be translated into a uniform resource locator (URL). Semantic annotations associated with the IoT device data for the IoT device in a device registry of the service provider environment may be identified, as in block 530. A request may be received for data using the URL to communicate with the virtual device representation, as in block 540. Canonical data may be obtained from the IoT device data in the virtual representation associated with the request for data, as in block 550. The canonical data may be translated according to the semantic annotations to fulfill the request for data, as in block 560.

For example, the virtual device representation of the device may be created on demand upon receiving a specific request at a specific URL. The virtual device representation of the device may be created on demand upon receiving a specific request at a URL. The existence of a unique identifier in the URL may be verified in a database by determining if the unique identifier maps to data in the database. If there is no unique identifier mapping to data in the database, an empty entry may be created in the database in order to commence storing data for that particular unique identifier thereby establishing the virtual device representation. The blank entry may be a JSON document. When the empty entry is first created there may be a data record for a desired state, a data record for a reported state, and/or a data record for metadata. As information is received from one or more devices, device information is populated into each of the data records (e.g., or nodes).

Figure 6:
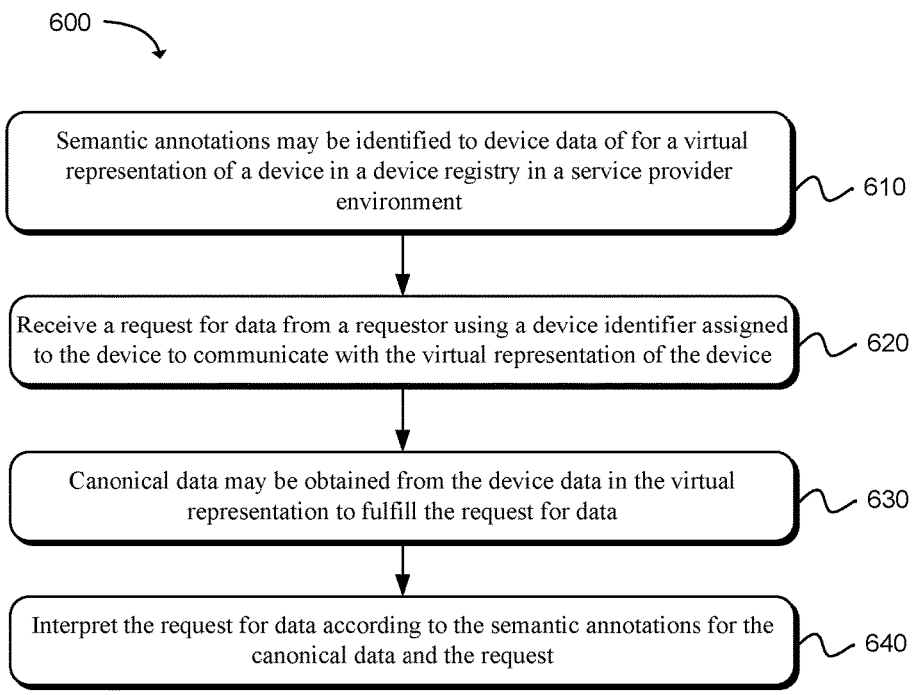
FIG. 6 is a flow diagram illustrating an example method for providing semantic translation for internet of things (IoT) devices according to one aspect of the present technology.

FIG. 6 is a flow diagram illustrating an example method for providing semantic translation representation of internet of things (IoT) devices according to one aspect of the present technology. The functionality 600 may be implemented as a method and executed as instructions on a machine, where the instructions are included on at least one computer readable medium or one non-transitory machine-readable storage medium. For example, starting in block 610, semantic annotations may be identified to a device (e.g., an Internet of Things (IoT) device or an application of a device) data of for a virtual representation of a device in a device registry in a service provider environment. A request for data may be received from a requestor using a device identifier assigned to the device to communicate with the virtual representation of the device, as in block 620. Canonical data may be obtained from the device data in the virtual representation to fulfill the request for data, as in block 630. The request for data may be interpreted according to the semantic annotations for the canonical data and the request, as in block 640. That is, canonical data may be stored for a shadow device and interpretations or translations of the data may be communicated back to a requesting device according to the type of device receiving the data.

Figure 7:
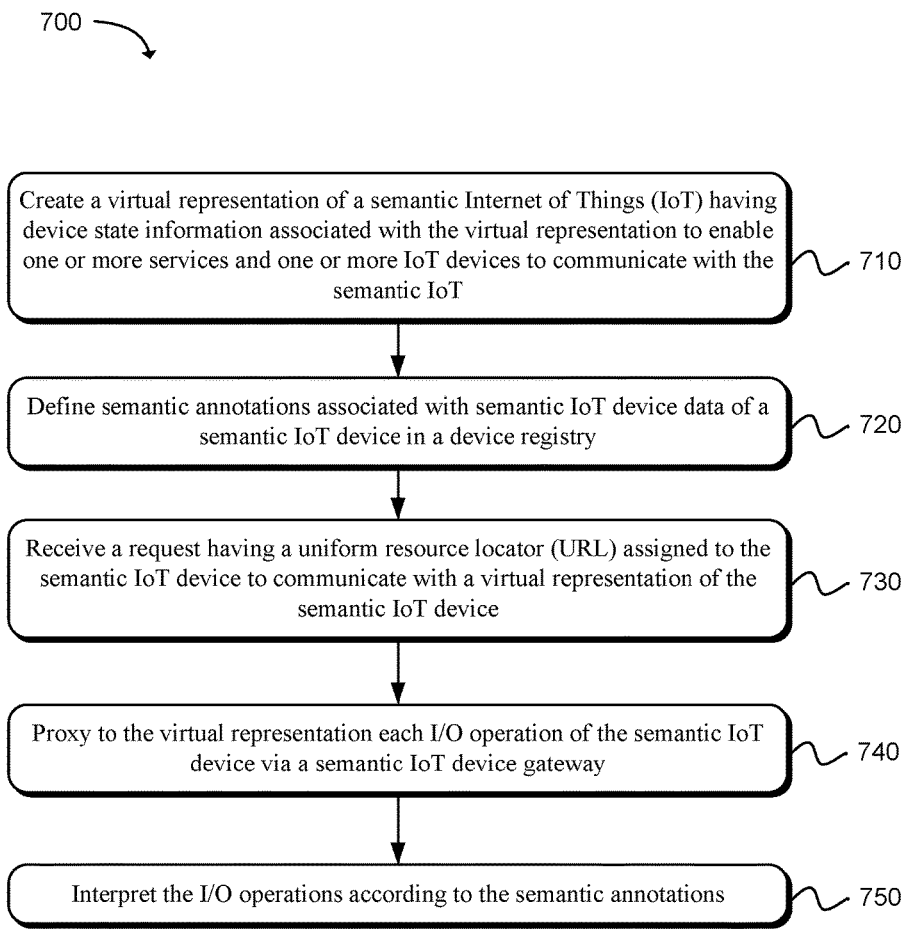
FIG. 7 is a flow diagram illustrating an additional example method for providing semantic translation for internet of things (IoT) devices using a device shadowing service according to one aspect of the present technology.

FIG. 7 is a flow diagram illustrating an additional example method for providing semantic translation representation of internet of things (IoT) devices using a device shadowing service according to one aspect of the present technology. The functionality 700 may be implemented as a method and executed as instructions on a machine, where the instructions are included on at least one computer readable medium or one non-transitory machine-readable storage medium. For example, starting in block 710, a persistent virtual representation of a semantic Internet of Things (IoT) having device state information associated with the virtual representation may be created to enable one or more services and one or more IoT devices to communicate with the semantic IoT. Semantic annotations associated with semantic IoT device data of a semantic IoT device in a device registry may be defined, as in block 720. A request having a uniform resource locator (URL) (e.g., a URL pattern or random URL) assigned to the semantic IoT device may be received to communicate with a virtual representation of the semantic IoT device, as in block 730. One or more I/O operations of the semantic IoT device may be proxied via a semantic IoT device gateway, as in block 740. The I/O operations may be interpreted according to the semantic annotations. In one aspect, a shadow device may include canonical data that may be used for interpretations or translations of the data and the interpretations or translations may be communicated back to a requesting device according to the type of device receiving the data.

In one aspect, in conjunction with and/or as part of at least one block of FIGS. 5-7, the operations of 500, 600, and/or 700 may include each of the following. The operations of 500, 600, and/or 700 may include authenticating each semantic IoT device according to semantic IoT device credentials of the semantic IoT device. The semantic IoT device credentials may be stored in the device registry. The semantic annotations include at least a portion of the metadata. The semantic annotations associated with ontological data of the device registry that describes semantic context in relation to the semantic IoT device may be defined. A state of the semantic IoT device may be synchronized with a state of the virtual representation. One or more events or notifications may be sent upon a state change to the virtual representation. Each event or notification may be annotated with the semantic annotations to enable the one or more services and the one or more IoT devices to interpret the event.

Figure 8:
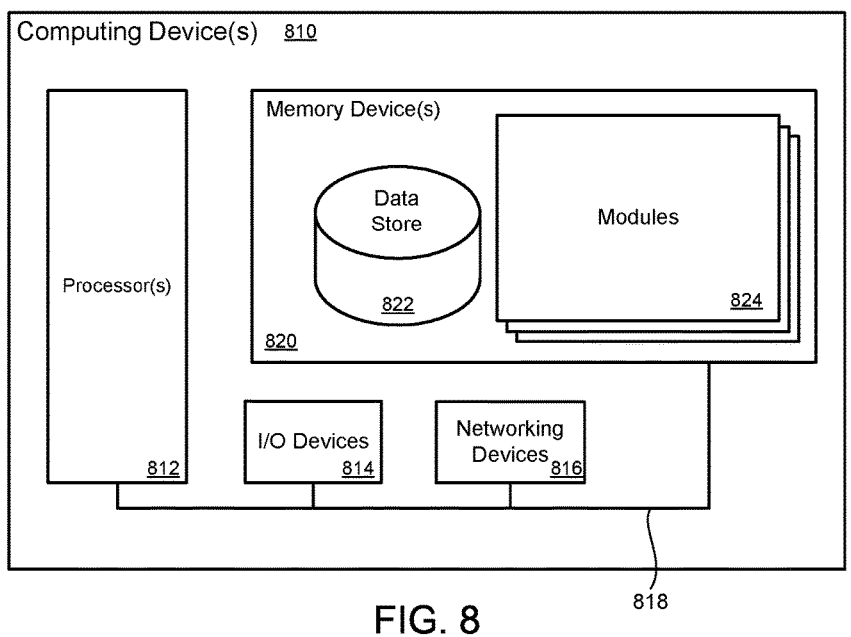
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. The modules 824 may execute the services described earlier, including the semantic annotation service. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or operation code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for providing semantic translation for representations of internet of things (IoT) devices in a computing service environment, the method comprises:
under control of at least a portion of at least one processor and memory configured with executable instructions that:
identify a virtual device representation of an Internet of Things (IoT) device in a service provider environment having device state information associated with the virtual device representation to enable one or more services of the service provider environment and one or more IoT devices to communicate with the virtual device representation of the IoT device;

assign a unique identifier to the IoT device to enable the one or more services and the one or more IoT devices to communicate with the virtual device representation;

translate the unique identifier into a uniform resource locator (URL);

identify semantic annotations associated with IoT device data for the IoT device in a device registry of the service provider environment;

receive a request for data using the URL to communicate with the virtual device representation;

obtain canonical data from the IoT device data in the virtual device representation associated with the request for data; and translate the canonical data according to the semantic annotations to send a translation of the IoT device data in the virtual device representation to a requestor to fulfill the request for data.

2. The method of claim 1, wherein the executable instructions further define the semantic annotations associated with ontological data that describes semantic context in relation to the IoT device.

3. The method of claim 1, wherein the executable instructions further track metadata of the IoT device using the device registry, wherein the metadata includes at least attributes, capabilities, and functionality of the IoT device.

4. The method of claim 1, wherein the executable instructions further translate the canonical data according to the semantic annotations to provide data in a format suitable to fulfill the request.

5. The method of claim 1, wherein the executable instructions further synchronize a state of the IoT device with a state of the virtual device representation.

6. A method, comprising executable instructions that:
under control of at least a portion of one processor and memory configured with executable instructions that:
identify semantic annotations to device data of a virtual representation of a device in a device registry in a service provider environment;
receive a request for data from a requestor using a device identifier assigned to the device to communicate with the virtual representation of the device;
obtain canonical data from device data in the virtual representation to fulfill the request for data; and
interpret the request for data using the semantic annotations for the canonical data and a device type of the requestor.

7. The method of claim 6, wherein the executable instructions further create the virtual representation of the device in a service provider environment having device state information associated with the virtual representation to enable one or more services of the service provider environment and one or more devices to communicate with the virtual representation.

8. The method of claim 7, wherein the executable instructions further assign a unique identifier to the device to enable the one or more services and the one or more devices to communicate with the virtual representation.

9. The method of claim 8, wherein the executable instructions further translate the unique identifier into a URL.

10. The method of claim 6, wherein the executable instructions further authenticate the device according to device credentials of the device, wherein the device credentials are stored in the device registry in the service provider environment.

11. The method of claim 6, wherein the executable instructions further track metadata of the device using the registry, wherein the metadata includes at least attributes, capabilities, and functionality of the device, wherein the semantic annotations include at least a portion of the metadata.

12. The method of claim 6, wherein the executable instructions further persist a state of the device to enable communication with the virtual representation.

13. The method of claim 6, wherein the executable instructions further define the semantic annotations associated with ontological data that describes semantic context in relation to the device.

14. The method of claim 6, wherein the executable instructions further synchronize a state of the device with a state of the virtual representation.

15. The method of claim 14, wherein the executable instructions further send an event upon a state change to the virtual representation.

16. The method of claim 6, wherein the executable instructions further annotate an event with the semantic annotations to enable the one or more services and the one or more devices to interpret the event.

17. A system running a service in a multi-tenant computing environment for providing semantic translation representation of internet of things (IoT) devices, comprising: one or more computers with executable instructions that when executed cause the system to:
identify a virtual device representation of an Internet of Things (IoT) device in a service provider environment having device state information associated with the virtual device representation to enable one or more services of the service provider environment and one or more IoT devices to communicate with the virtual device representation of the IoT device;
assign a unique identifier to the IoT device to enable the one or more services and the one or more IoT devices to communicate with the virtual device representation;
translate the unique identifier into a uniform resource locator (URL);
identify semantic annotations associated with IoT device data for the IoT device in a device registry of the service provider environment;
receive a request for data using the URL to communicate with the virtual device representation;
obtain canonical data from the IoT device data in the virtual device representation associated with the request for data; and
translate the canonical data according to the semantic annotations to send a translation of the IoT device data in the virtual device representation to a requestor to fulfill the request for data.

18. The system of claim 17, wherein the executable instructions further synchronize a state of the IoT device with a state of the virtual device representation.

19. The system of claim 17, wherein the executable instructions further track metadata of the IoT device using the device registry, wherein the metadata includes at least attributes, capabilities, and functionality of the IoT device, and wherein the semantic annotations are included in at least a portion of the metadata.

20. The system of claim 17, wherein the executable instructions further:
persist a state of the semantic IoT device to enable communication with the virtual device representation;
send one or more events upon a state change to the virtual device representation; and annotate an event with the semantic annotations to enable the one or more services and the one or more IoT devices to interpret the event.

\* \* \* \* \*